US 12,455,054 B2

(12) United States Patent
Sartore et al.

(10) Patent No.: US 12,455,054 B2
(45) Date of Patent: Oct. 28, 2025

(54) SOLAR SIMULATOR APPARATUS

(71) Applicant: ECOPROGETTI S.R.L., Carmignano di Brenta (IT)

(72) Inventors: Domenico Sartore, Carmignano di Brenta (IT); Eugenio Gonzato, Carmignano di Brenta (IT); Federico Quartiani, Grantorto (IT); Fabio Nichele, Tezze sul Brenta (IT)

(73) Assignee: ECOPROGETTI S.R.L., Carmignano di Brenta (IT)

( * ) Notice: Subject to any disclaimer, the term of this patent is extended or adjusted under 35 U.S.C. 154(b) by 0 days.

(21) Appl. No.: 18/522,124

(22) Filed: Nov. 28, 2023

(65) Prior Publication Data

US 2024/0175557 A1 May 30, 2024

(30) Foreign Application Priority Data

Nov. 29, 2022 (IT) .......................... 102022000024621

(51) Int. Cl.
| | |
|---|---|
| *F21S 8/00* | (2006.01) |
| *F21V 7/00* | (2006.01) |
| *F21V 29/57* | (2015.01) |
| *F21V 29/61* | (2015.01) |
| *F21Y 105/16* | (2016.01) |
| *F21Y 115/10* | (2016.01) |
| *H02S 50/15* | (2014.01) |

(52) U.S. Cl.
CPC ............ *F21S 8/006* (2013.01); *F21V 7/0083* (2013.01); *F21V 29/57* (2015.01); *F21V 29/61* (2015.01); *H02S 50/15* (2014.12); *F21Y 2105/16* (2016.08); *F21Y 2115/10* (2016.08)

(58) Field of Classification Search
CPC .......... F21S 8/006; F21V 29/56; F21V 29/57; F21V 29/58; F21V 29/59; F21V 29/508; F21V 29/51; H02S 50/15; H02S 50/10; F24F 2221/02
See application file for complete search history.

(56) References Cited

U.S. PATENT DOCUMENTS

| | | | |
|---|---|---|---|
| 8,651,704 B1* | 2/2014 | Gordin | F21V 29/60 362/373 |
| 2006/0176694 A1* | 8/2006 | Lee | G01N 21/255 362/253 |
| 2008/0062694 A1* | 3/2008 | Lai | F28D 1/0478 362/294 |

(Continued)

FOREIGN PATENT DOCUMENTS

| | | |
|---|---|---|
| CN | 107204742 A | 9/2017 |
| CN | 214306745 U | 9/2021 |

OTHER PUBLICATIONS

Search Report for Corresponding Italian Application No. 102022000024621, dated Mar. 21, 2023.

*Primary Examiner* — Zheng Song
*Assistant Examiner* — James M Endo
(74) *Attorney, Agent, or Firm* — K&L Gates LLP

(57) ABSTRACT

A solar simulator apparatus to perform a test on at least one object including a containing structure having an internal operating space in which there is defined an irradiation chamber equipped with a lighting unit; a rest plane associated with said containing structure and configured to support said object, said rest plane being able to be selectively positioned facing said lighting unit.

8 Claims, 4 Drawing Sheets

(56) References Cited

U.S. PATENT DOCUMENTS

| | | | |
|---|---|---|---|
| 2009/0034275 A1* | 2/2009 | Cheng | F21K 9/00 362/373 |
| 2009/0256581 A1* | 10/2009 | Lu | H02S 50/10 198/339.1 |
| 2009/0287446 A1* | 11/2009 | Wang | H01L 31/02167 438/73 |
| 2010/0073011 A1* | 3/2010 | Svidenko | G01N 17/002 73/865.6 |
| 2010/0149799 A1* | 6/2010 | Liu | F21V 29/67 362/249.02 |
| 2011/0006657 A1* | 1/2011 | Liu | F21V 29/71 313/12 |
| 2011/0012635 A1* | 1/2011 | Lu | H02S 50/10 136/290 |
| 2011/0025354 A1* | 2/2011 | Shimotomai | G01N 21/9501 324/761.01 |
| 2011/0026264 A1* | 2/2011 | Reed | F21V 29/76 362/373 |
| 2011/0103423 A1* | 5/2011 | Hsu | G01N 17/004 374/43 |
| 2012/0133372 A1* | 5/2012 | Tsai | H02S 50/10 324/501 |
| 2013/0019942 A1* | 1/2013 | Tachibana | H01L 31/0463 257/E31.124 |
| 2013/0146576 A1* | 6/2013 | Khan | H01L 31/048 219/201 |
| 2014/0022756 A1* | 1/2014 | Roest | F21V 29/70 362/2 |
| 2014/0146305 A1* | 5/2014 | Villuendas Yuste | G01J 3/0291 356/323 |
| 2014/0184050 A1* | 7/2014 | Mizuta | F21V 29/763 313/45 |
| 2014/0185305 A1* | 7/2014 | Takahashi | H10K 50/87 362/373 |
| 2017/0030567 A1* | 2/2017 | Sun | F21V 29/59 |
| 2017/0167712 A1* | 6/2017 | Melzner | F21V 29/57 |
| 2017/0284738 A1* | 10/2017 | Watanabe | F28D 15/0275 |
| 2017/0333935 A1* | 11/2017 | Chaoui | F24F 13/28 |
| 2018/0031223 A1* | 2/2018 | Mai | F21V 29/677 |
| 2018/0125016 A1* | 5/2018 | Dufresne | A01G 9/1423 |
| 2018/0145628 A1* | 5/2018 | De Vos | F24S 40/90 |
| 2018/0159469 A1* | 6/2018 | Trupke | H02S 50/15 |
| 2018/0309404 A1* | 10/2018 | Hare | H02S 50/15 |
| 2018/0310438 A1* | 10/2018 | Murata | B41J 11/0021 |
| 2020/0236870 A1* | 7/2020 | Lys | G01K 1/026 |
| 2020/0386393 A1* | 12/2020 | Dieser | A01G 9/249 |
| 2021/0116082 A1* | 4/2021 | Pollastri | A61K 49/0006 |
| 2021/0247080 A1* | 8/2021 | Nidam | F24F 8/20 |
| 2022/0240458 A1* | 8/2022 | Breza | A01G 7/045 |
| 2024/0077194 A1* | 3/2024 | Liu | G05D 23/192 |
| 2024/0163996 A1* | 5/2024 | Lys | H05B 47/196 |

\* cited by examiner

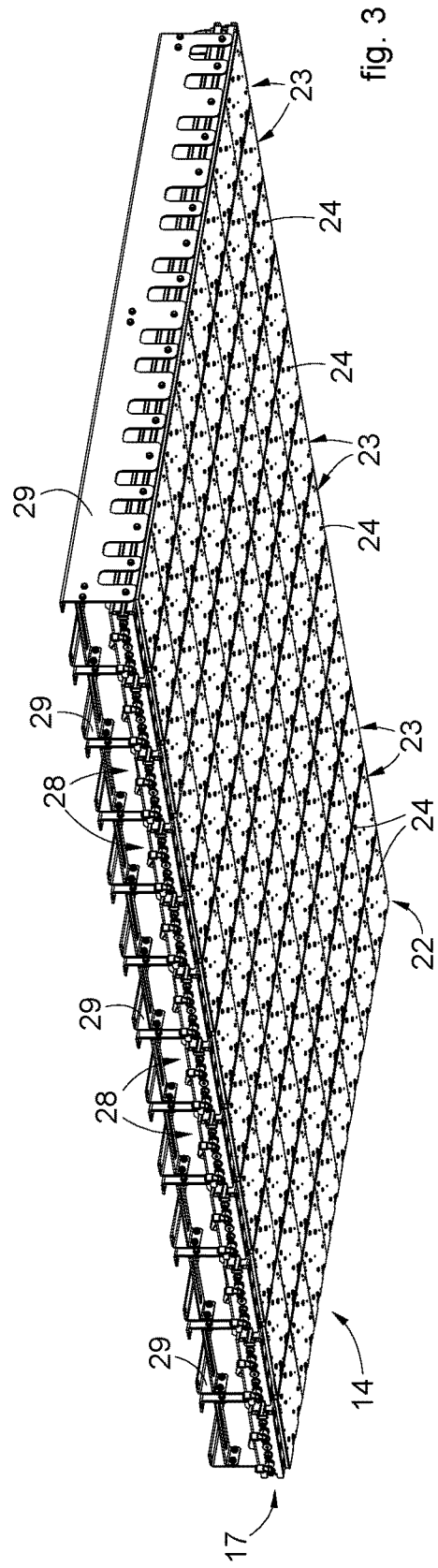
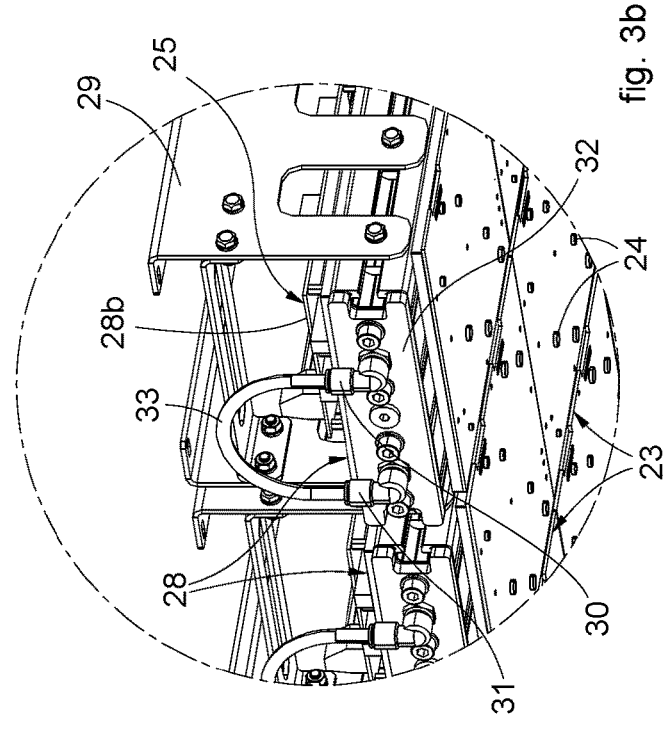
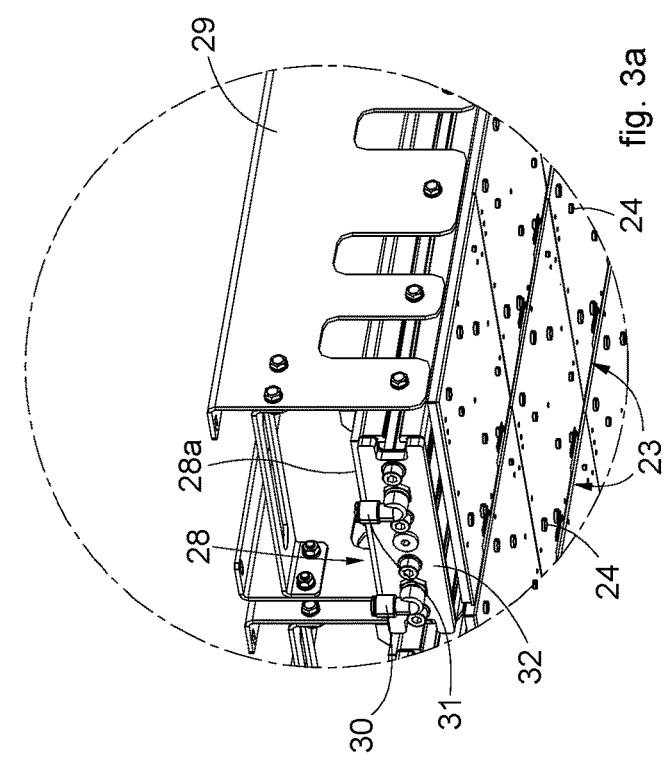

SOLAR SIMULATOR APPARATUS

FIELD OF THE INVENTION

The present invention concerns a solar simulator apparatus whose main function is to test, in a continuous mode, that is, for an extended period of time, even for whole days, the operation of photovoltaic modules or panels, or photovoltaic strings or cells, hereafter indicated with the generic term "object", by recreating an artificial light inside a closed irradiation chamber in which the object is housed, by means of LED light sources.

Although the description specifically refers to photovoltaic panels or strings, or photovoltaic cells, the present invention can also be used to test other types of objects, not necessarily photovoltaic ones.

BACKGROUND OF THE INVENTION

In the sector of producing photovoltaic panels, the need to test photovoltaic panels, strings or cells before they go to market is known. This is achieved by irradiating said panels for a certain period of time, even prolonged, up to whole days, with an artificial light that simulates the conditions of exposure to natural sunlight, in order to measure characteristic parameters such as the I-V curve, for example.

To perform this type of tests, a number of solar simulator apparatuses are known, which essentially comprise a containing structure inside which an irradiation chamber is made, provided with a LED lighting plane and a rest plane directly facing the lighting plane and on which the object to be tested is disposed, on each occasion.

The lighting plane has an irradiating surface consisting of a plurality of LED boards which are suitably powered and controlled, through corresponding control boards, to generate the artificial light. The individual LEDs of each board are capable of emitting beams of light at different wavelengths in order to determine an overall radiation as similar as possible to the natural solar spectrum.

One disadvantage of known simulator apparatuses is that the LED boards, once they have been switched on, generate a considerable thermal flow which, if not properly dissipated, leads to a rapid overheating of the LED boards and therefore to a compromise in the quality of the test, caused by the distortion of the emission wavelengths of the LEDs themselves.

The same phenomenon occurs for the object of the test, be it a photovoltaic panel, string or cell which, when illuminated by the radiation produced by the LEDs, generates current, and therefore heat which, if not adequately dissipated, causes it to gradually overheat, compromising the quality of the test.

This disadvantage proves to be particularly problematic especially in tests of a continuous and prolonged duration, for example of several days, for which thermal control, especially of the irradiating surface but also of the object subjected to lighting, is essential in order to obtain reliable results.

Document CN214306745U identifies a passive type thermal control solution through the use of a finned dissipation surface associated with the irradiating surface. However, this solution does not guarantee sufficient cooling efficiency, especially in the case of tests of a prolonged duration, and does not solve the problem of overheating of the object being tested.

There is therefore the need to perfect a solar simulator apparatus that can overcome at least one of the disadvantages of the state of the art.

To do this, it is necessary to solve the technical problem of guaranteeing sufficient accuracy of tests on photovoltaic panels, strings or photovoltaic cells, especially when the tests are carried out in a continuous mode, that is, for a prolonged period of time, even for whole days, without ever deactivating the irradiating surface.

In particular, one purpose of the present invention is to provide a solar simulator apparatus in which the irradiating surface can remain active in continuous mode without loss of efficiency or quality of the artificial light produced.

Another purpose of the present invention is to provide a solar simulator apparatus that allows to reduce the overheating of the object being tested, thus maintaining it at an optimal temperature.

Another purpose of the present invention is to provide a solar simulator apparatus in which the light produced by the LEDs is conveyed onto the object being tested in an optimized manner.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes and to resolve the technical problem disclosed above in a new and original way, also achieving considerable advantages compared to the state of the prior art, a solar simulator apparatus according to the present invention, to perform a test on at least one object, such as a photovoltaic panel, cell or string, comprises:

- a containing structure having an internal operating space in which there is defined an irradiation chamber equipped with an LED lighting unit,
- a rest plane, advantageously horizontal, associated with the support structure and configured to support the object, the rest plane being able to be selectively positioned facing the lighting unit.

In accordance with one aspect of the present invention, the apparatus comprises a first liquid cooling unit dedicated to thermally controlling the lighting unit and provided with both a heat extraction device associated with the lighting unit, and also with a connected cooling device outside the containing structure.

By doing so, the solar simulator apparatus is able to work in continuous irradiation, even for several days, while maintaining the accuracy required by this type of test. In fact, liquid cooling allows the lighting unit to be kept at a controlled temperature, preventing the LEDs from overheating, which would affect their emissive capacity in the desired wavelength ranges.

In accordance with another aspect of the present invention, the lighting unit is formed by a flat matrix of LED boards and by corresponding control boards disposed aligned at a certain distance from the respective LED boards, with the heat extraction device interposed. The distance between the LED boards and the corresponding control boards allows to create a hollow space useful for optimizing the cooling of both groups of boards.

In accordance with another aspect of the present invention, the heat extraction device comprises a plurality of cooling plates provided with delivery and return channels to convey a cooling fluid, each of the cooling plates being parallel and independent from the others and associated with a respective row of LED boards and control boards, forming a repetitive modular structure with them. This configuration, in addition to optimizing the independent heat exchange of each row of LED and control boards, allows to constructively simplify the apparatus and to make its design scalability much quicker, in case it needs to be made with different sizes. In addition to this, both the assembly as well as the maintenance or replacement of individual components are simplified.

In accordance with another aspect of the present invention, on each cooling plate there are created a first multilayer interface, to which the LED boards are attached, and an opposing second multilayer interface, to which the corresponding control boards are attached by interposing support elements. The presence of specific multilayer interfaces allows to optimize the transmission of the heat emitted by the boards and exchanged with the cooling fluid.

In accordance with another aspect of the present invention, the apparatus comprises a second air cooling unit dedicated to cooling the object and provided with a central collector equipped with diffuser elements, with a suction device associated with the central collector at the lower part, the central collector and suction device being disposed in a lower zone of the operating space, and also with an air feeding circuit connected to the central collector and to an air conditioning device disposed outside the containing structure. The second cooling unit therefore allows to keep the temperature of the object controlled and managed while the test is performed.

In accordance with another aspect of the present invention, the rest plane is formed by a frame having a plurality of sustaining bars on each of which one or more support elements are mounted, able to be selectively positioned along a length of the sustaining bars. The presence of selectively positionable support elements allows to vary the size of the actual rest plane where the object to be tested is placed depending on the sizes of the latter.

In accordance with another aspect of the present invention, the support elements are provided with a conical end configured to define a resting point for the object. The punctual resting point that is thus created allows to minimize the thermal bridge between the object and the rest plane, and therefore to maximize test accuracy.

In accordance with another aspect of the present invention, the rest plane is disposed at a distance from the flat matrix of LED boards such as to optimize a distance between the latter and the object, such distance being comprised between approximately 200 mm and 350 mm, depending on different conditions. This distance allows to obtain an overall radiation as similar as possible to actual solar radiation, guarantee irradiation uniformity over the entire test area, guarantee the maximum accuracy of total spectral uniformity over the entire test area, and allow efficient thermal control.

In accordance with another aspect of the present invention, the containing structure is formed by a plurality of perimeter walls, on the external and internal surfaces of which there is applied a layer of matt black paint.

In accordance with another aspect of the present invention, the irradiation chamber is defined by a sub volume of the operating space comprised between the lateral perimeter walls, the lighting plane and the rest plane, wherein on the internal surfaces of the lateral perimeter walls there are installed mirrors facing the irradiation chamber. This also allows the "lateral" LED radiation to be efficiently conveyed toward the object being tested, instead of dispersing it to the outside.

DESCRIPTION OF THE DRAWINGS

These and other aspects, characteristics and advantages of the present invention will become apparent from the following description of some embodiments, given as a non-restrictive example with reference to the attached drawings wherein:

FIG. 3 is an isolated and enlarged detail of FIGS. 1-2 which shows the lighting unit and the first liquid cooling unit;

FIGS. 3a and 3b are enlarged details of FIG. 3;

Figure 1:
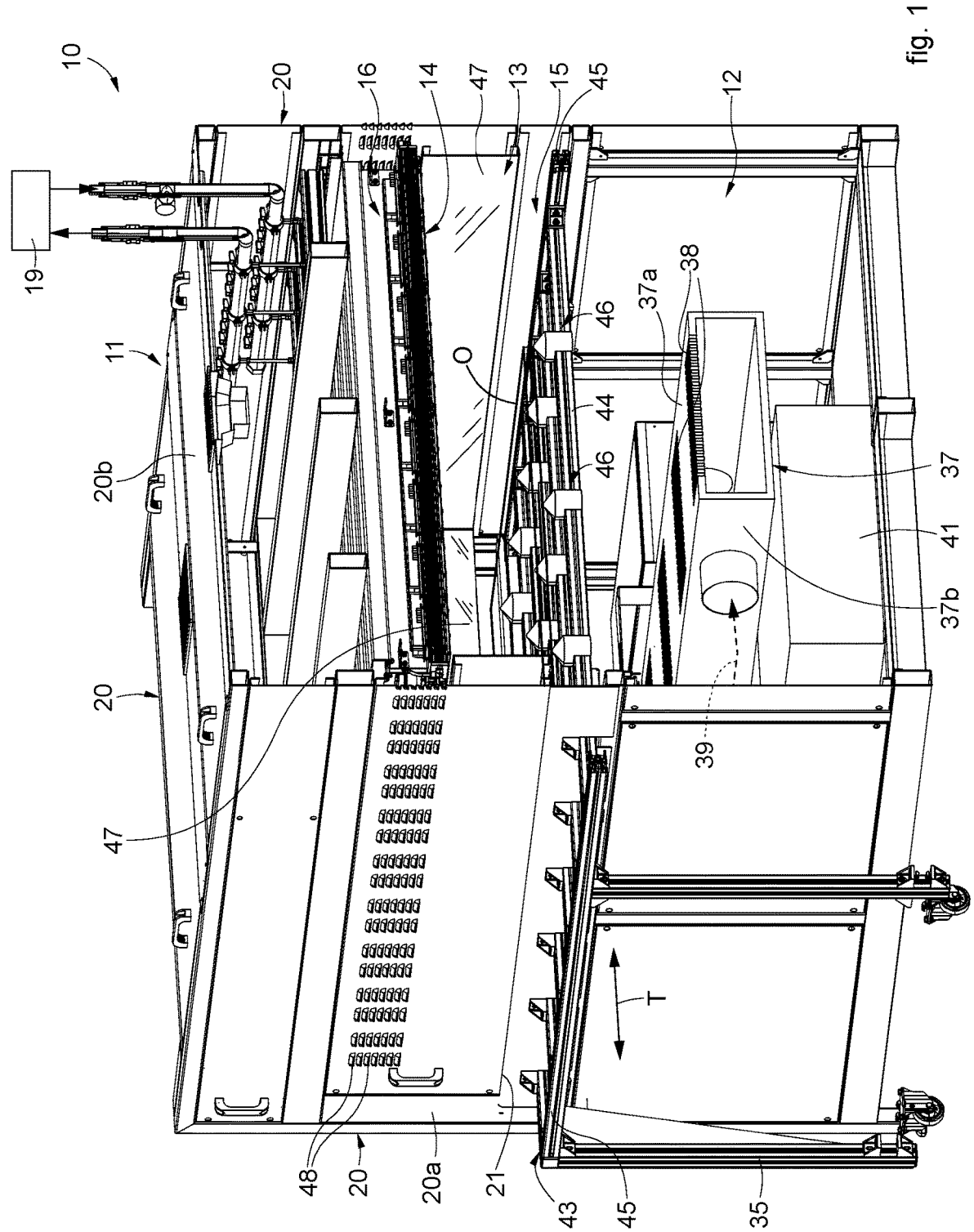
FIGS. 1 and 2 are three-dimensional cross section (FIG. 1) and longitudinal section (FIG. 2) views of a solar simulator apparatus according to the present invention.

We must clarify that the phraseology and terminology used in the present description, as well as the figures in the attached drawings also in relation as to how described, have the sole function of better illustrating and explaining the present invention, their purpose being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF AN EMBODIMENT OF THE PRESENT INVENTION

Figure 2:
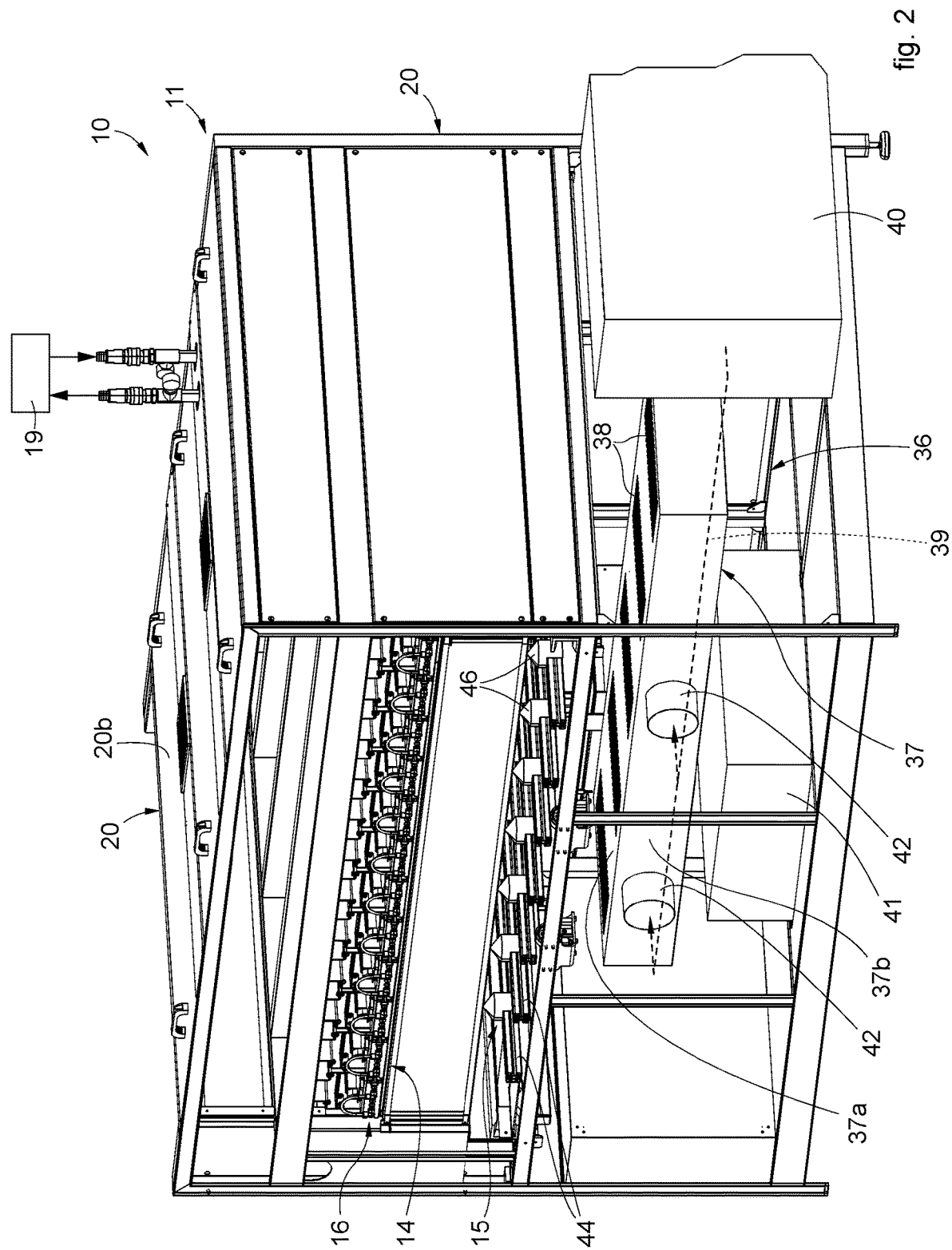

With reference to FIGS. 1 and 2, a solar simulator apparatus 10, according to the present invention, hereafter apparatus 10, comprises a containing structure 11, advantageously of a box-shaped type, having an internal operating space 12 in which there is defined, in an upper zone, an irradiation chamber 13 equipped with a LED lighting unit 14.

The containing structure 11 is formed by a plurality of perimeter walls 20 that define the operating space 12 and allow to insulate the irradiation chamber 13 with respect to the outside, in order to obtain the optimal conditions to carry out the test.

Optionally, one or more of the lateral walls 20 can be provided with ventilation apertures 48 in order to allow further evacuation of the heat produced within the operating space 12 during operation.

The apparatus 10 also comprises a horizontal rest plane 15 associated with the containing structure 11 and configured to support an object O, which can be chosen from a photovoltaic panel, or a photovoltaic string or cell, to be tested. FIG. 1 shows an example of a photovoltaic panel disposed on the rest plane 15.

The rest plane 15 is selectively movable, relative to the containing structure 11, between a loading/unloading position in which it is located outside the operating space 12 and ready to receive the object O, or return it at the end of the test, and a testing position (FIGS. 1-2) in which it is located inside the operating space 12, facing the lighting unit 14 at the lower part.

The rest plane 15 is mounted on a slider 35 that allows it to be inserted into, and extracted from, the operating space 12 in a transverse direction T, through an aperture 21 with a rectangular section made in a lateral perimeter wall 20a of the containing structure 11.

Optionally, the aperture 21 can be provided with a wider section zone suitable to allow the insertion of a support kit to be mounted on the rest plane 15, dedicated to tests on photovoltaic strings and cells, which have much smaller sizes than those of a panel.

When the rest plane 15 is in the testing position, it delimits the irradiation chamber 13 at the lower part, which is therefore defined by the volume of space comprised between the lateral perimeter walls 20, the lighting unit 14 and the rest plane 15 on which the object O is disposed. When the rest plane 15 is in the testing position, the irradiation chamber 13 is completely defined and insulated with respect to the outside.

According to one aspect of the invention, the apparatus 10 comprises a first liquid cooling unit 16 dedicated to the thermal control, that is, the cooling, of the lighting unit 14.

With particular reference to FIGS. 3, 3a, 3b and 4, the first cooling unit 16 is provided with both a modular heat extraction device 17 disposed in contact with the lighting unit 14 and provided with channels, or conduits, 18 (FIG. 4) for the confined conveyance of a cooling liquid, and also with a connected cooling device 19 (schematized in FIGS. 1-2) disposed outside the operating space 12, that is, the containing structure 11, and configured to receive the cooling liquid, condition its temperature in a managed manner, and send it back to the heat extraction device 17.

According to some embodiments, the lighting unit 14 is formed by a flat matrix of LED boards 23, each provided with its own LEDs 24 capable of emitting light beams on different wavelengths, and defining overall a lighting plane 22 that delimits the irradiation chamber 13 at the upper part. Corresponding control boards 25 are disposed aligned and facing at a certain distance from the respective LED boards 23, defining with them a hollow space which, as will be explained below, is dedicated to the installation of the heat extraction device 17.

The configuration of the lighting unit 14 with the lighting plane 22 distanced from the control boards 25 advantageously allows to limit the overheating of the LED boards 23 and, as will be explained below, to also facilitate and optimize the heat exchange operated by the heat extraction device 17.

The heat extraction device 17 is disposed between the lighting plane 22 and the control boards 25, and comprises a plurality of cooling plates 28 inside which the cooling liquid is made to flow, and each one is associated with a single row of LED boards 23 and control boards 25.

The cooling plates 28 are essentially defined by an extruded profile in metal material, preferably aluminum.

The cooling plates 28 are parallel to each other and independent, and each one of them is associated with a respective row of LED boards 23 and control boards 25.

The individual cooling plates 28 are mounted on respective racks 29 connected to each other and attached to the perimeter walls 20 of the containing structure 11.

Figure 4:
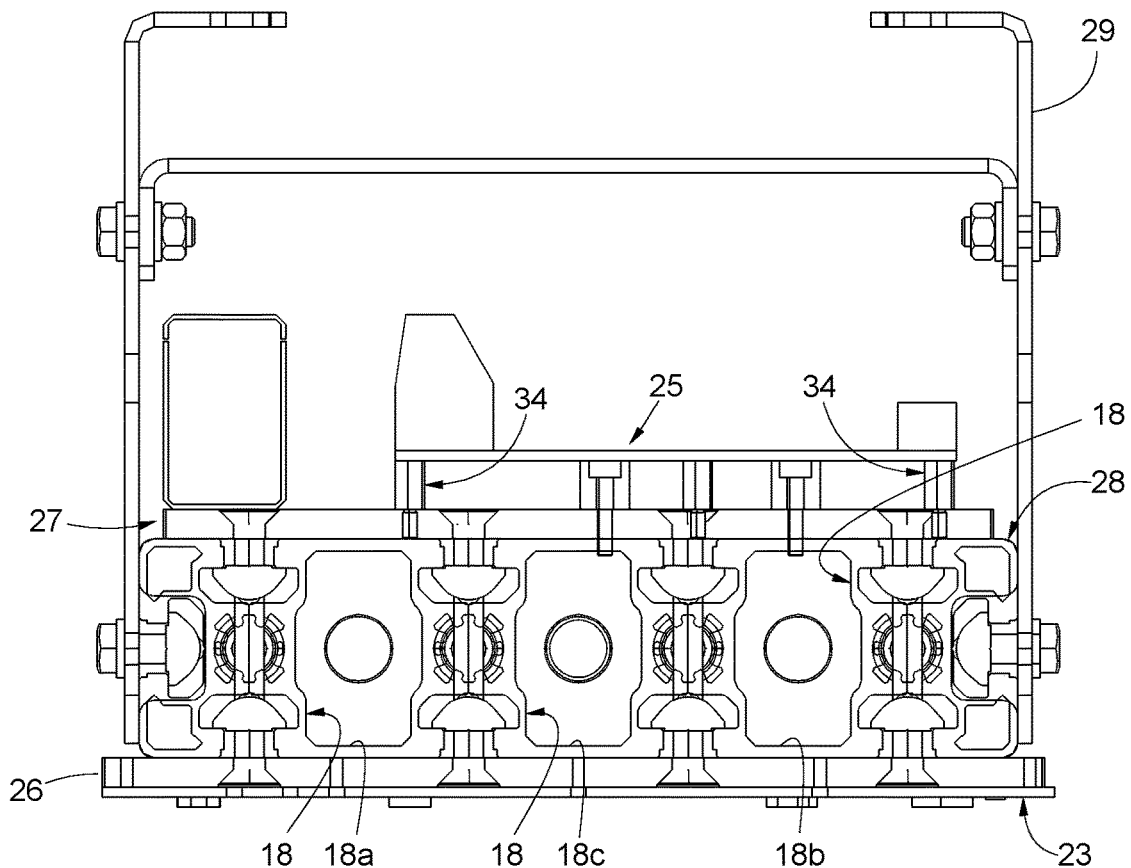
FIG. 4 is a cross section showing a single cooling plate on which a row of LED boards and an opposing row of respective control boards are attached.

In other words, as can be seen in FIG. 4, a repetitive and modular structure is created, consisting of a rack 29 on which a corresponding cooling plate 28 is mounted, in which a row of LED boards 23 and an opposing row of respective control boards 25 are attached on the cooling plate 28.

The cooling therefore occurs through heat exchange between the boards 23, 25 and the cooling liquid flowing inside the cooling plates 28, which heats up by absorbing heat and removing it from the boards 23, 25. The cooling liquid is then regenerated, cooling it by means of the cooling device 19, and continuously reintroduced into the cooling plates 28 at a delivery temperature of around 19° C., with a volumetric flow rate of about 47 liters/min and a pressure of about 1.5-2 bar.

With reference to FIGS. 3a, 3b and 4, each cooling plate 28 is provided with at least two channels 18, of which a first channel, or delivery channel (or return channel, in an alternative configuration), 18a and a second channel, or return channel (or delivery channel, in an alternative configuration), 18b, which terminate in correspondence with two opposing ends 28a, 28b of the cooling plate 28, where there are respective inlet 30 and outlet 31 connectors screwed to a ring nut 32.

Between the first channel 18a and the second channel 18b there is a hollow space, which in the example of FIG. 4 is configured as a further channel 18c, having the function of laterally distancing the first and second channel 18a, 18b, preventing an unwanted thermal exchange between the two flows of cooling liquid flowing inside them.

According to some embodiments, the feed and extraction of the cooling liquid occur through the inlet 30 and outlet 31 connectors present in correspondence with a first end 28a of the cooling plate 28, while on the other side the two channels 18a, 18b are fluidically connected to each other through a recirculation pipe 33 (FIG. 3b) connected to the inlet 30 and outlet 31 connectors present in correspondence with an opposing second end 28b of the cooling plate 28. Therefore, the cooling liquid travels a delivery and return segment in opposing directions according to a U-shaped path.

The inlet 30 and outlet 31 connectors of the cooling plates 28 from which the feed and extraction of the cooling liquid occur are all fluidically connected, through a special circuit, to the cooling device 19 (FIGS. 1-2).

It is clear that the symmetry of the cooling plates 28, given by the presence of the inlet 30 and outlet 31 connectors on both their ends 28a, 28b, also allows to create different feed/extraction paths of the cooling liquid.

With reference to FIG. 4, on each cooling plate 28 there are created a first multilayer interface 26, to which the LED boards 23 are attached, and an opposing second multilayer interface 27, to which the corresponding control boards 25 are attached by means of the interposition of support elements, or spacers, 34.

The first interface 26 is attached to the wall of the cooling plate 28 and comprises a sandwich consisting of a layer of thermal paste, an attachment plate for the LED boards 23 and a mat made of thermal material that constitutes the outermost layer to which the LED boards 23 are attached.

The second interface 27 is attached to the wall of the cooling plate 28 which is opposite the one that has the first interface 26, and comprises a layer of thermal paste on which there is attached an attachment plate for the control boards 25, a further layer of thermal paste on which the support elements 34 are attached, and a mat made of thermal material that constitutes the outermost layer to which the control boards 25 are attached.

Such a configuration of the first cooling unit 16 advantageously allows to achieve an optimized thermal control of both groups of LED 23 and control 25 boards, since the heat exchange is dual and differentiated on two distinct and dedicated interface surfaces 26, 27. In particular, the thermal control on the LED boards 23 guarantees that, at steady state, the LED boards 23 never exceed a threshold temperature that would affect their correct operation.

According to some embodiments, which can be combined with the embodiments described above, with reference to FIGS. 1-2, the apparatus 10 comprises a second air cooling unit 36, dedicated to cooling the object O during the execution of the test.

The second cooling unit 36 is provided with a central collector 37 equipped with diffuser elements 38 which is disposed in a lower, or bottom, zone of the operating space 12, an air feeding circuit 39 connected to the central collector 37 and to an air conditioning device 40 disposed outside the containing structure 11, and a suction device 41 associated with the central collector 37 at the lower part to convey a return air flow outward.

The central collector 37 is disposed below the rest plane 15, when the latter is in the testing position, so as to convey a flow of delivery air at a controlled and adjustable temperature toward a lower surface of the object O disposed on the rest plane 15.

In other words, the object O disposed on the rest plane 15 faces the lighting unit 14 with its upper surface and the central collector 37 with its opposing lower surface, net of the contact points required to support it.

The central collector 37 is substantially configured as a parallelepiped-shaped conduit with closed ends, provided with an upper wall 37a where the diffuser elements 38 are installed and two opposing lateral walls 37b where one or more air inlet pipes 42, forming part of the feeding circuit 39, are connected.

In an example embodiment, the central collector 37 is served by 4 air inlet pipes 42, two for each longer lateral wall 37b, and is provided with a certain number of diffuser elements 38 equally spaced apart over the length of the central collector 37.

According to some embodiments, both the central collector 37 as well as the air inlet pipes 42 of the feeding circuit 39 can be insulated in order to prevent heating of the incoming air flow that has to be directed toward the object O.

The delivery air flow, arriving from the air conditioning device 40 with an approximate temperature of around 10° C., enters through the air inlet pipes 42 into the central collector 37 and exits in a directed manner from the diffuser elements 38 toward the object O which, continuously and at steady state, is able to remain at an optimal temperature of about 35° C. The return air flow is then drawn in by the suction device 41 and conveyed outward in order to be reprocessed by means of the external conditioning device 40 and reintroduced into the air feeding circuit 39.

According to some embodiments, which can be combined with all the embodiments described above, with reference to FIGS. 1-2 and 5, the rest plane 15 is formed by a frame 43 comprising a plurality of sustaining bars 44 parallel to each other. The sustaining bars 44 are connected to two opposing head bars 45 (FIG. 1).

One or more support elements 46, configured to define a resting point for the object O, are preferably mounted on each sustaining bar 44.

The support elements 46 are selectively positionable, by making them slide, along the sustaining bars 44 to define a rest plane with a sufficient size to stably sustain the object O. In this way, it is possible to easily and quickly adjust the disposition of the support elements 46 so as to adequately support panels and, by means of a suitable kit, also strings or cells with a variable shape not known a priori.

The support elements 46 are provided with a conical end 46a able to minimize the thermal bridge between the object O and the rest plane 15, and thus maximize the test accuracy.

The support elements 46 are made of matt black polymeric material with low thermal conductivity.

According to some embodiments, which can be combined with all the embodiments described above, the rest plane 15 is located at a distance H from the lighting plane 22 such as to optimize the distance between the latter and the object O to be irradiated, so as to have an overall radiation as similar as possible to actual solar radiation, and at the same time allow efficient thermal control. See FIG. 5.

The distance H is comprised between about 200 mm and about 350 mm.

According to some embodiments, which can be combined with all the embodiments described above, a layer of matt black paint is applied to the external and internal surfaces of the perimeter walls 20 of the containing structure 11.

In particular, the layer of matt black paint on the internal surfaces has the function of minimizing radiation reflection, and is applied on all the surfaces where reflection is unwanted, and instead maximum absorption and emissivity is desired. Instead, the layer of matt black paint on the external surfaces allows to maximize the emissivity toward the outside, thus allowing a greater dissipation of the heat generated inside, as well as a more accurate infrared thermography, which yields more precise temperature values by scanning surfaces with high emissivity values.

According to some embodiments, which can be combined with all the embodiments described above, with reference to FIGS. 1, 2 and 5, mirrors 47 are installed on the lateral surfaces of the irradiation chamber 13 to efficiently convey the light radiations emitted by the LEDs 24 toward the object O, which would otherwise be dispersed in the lateral direction.

Figure 5:
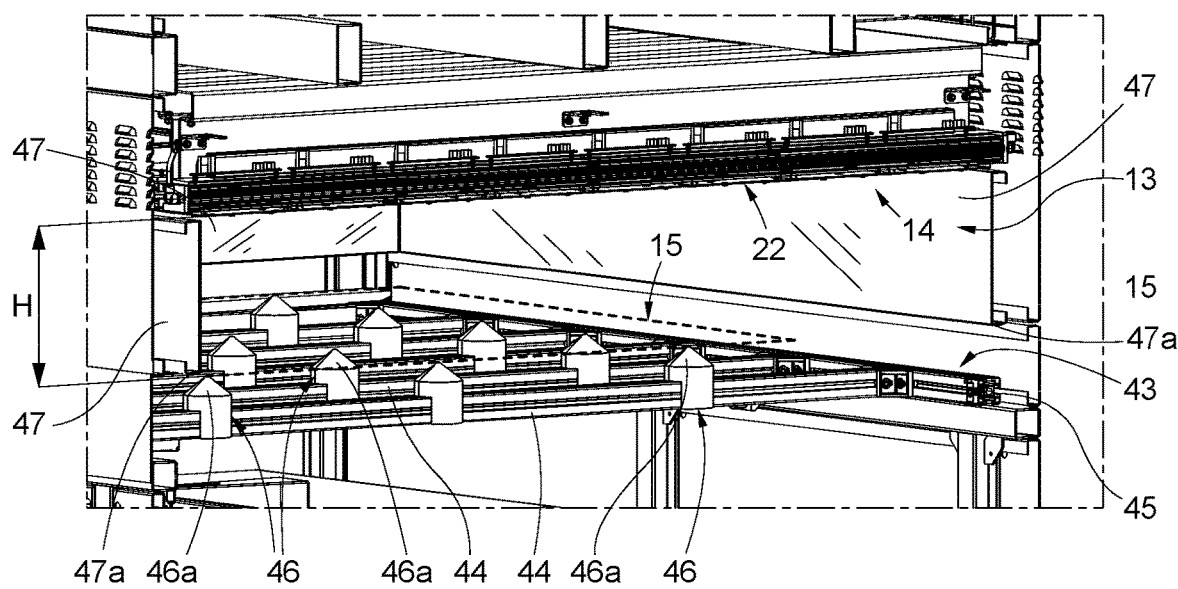
FIG. 5 is an enlarged detail of FIG. 1.

According to some embodiments, each mirror 47 can be provided with a curved border 47a to guarantee maximum continuity of reflection in correspondence with the edges, as in FIG. 5.

An optional mirror can be installed orthogonally to the rest plane 15 so as to cover the zone with the wider section which is suitable to allow the insertion of a support kit dedicated to tests on photovoltaic strings and cells, which have much smaller sizes than those of a panel.

The apparatus 10 is also equipped with a control unit operatively connected to the lighting unit 14, the first cooling unit 16 and the second cooling unit 36, and overall manageable via a user interface. The control unit can also be operatively connected to optional instrumentation such as, for example, brightness, temperature or other sensors disposed inside the irradiation chamber 13.

It is clear that modifications and/or additions of parts may be made to the apparatus 10 as described heretofore, without departing from the field and scope of the present invention, as defined by the claims.

It is also clear that, although the present invention has been described with reference to some specific examples, a person of skill in the art will be able to achieve other equivalent forms of solar simulator apparatus, having the characteristics as set forth in the claims and hence all coming within the field of protection defined thereby.

In the following claims, the sole purpose of the references in brackets is to facilitate their reading and they must not be considered as restrictive factors with regard to the field of protection defined by the claims.

The invention claimed is:

1. A solar simulator apparatus, to perform a test on at least one object, such as a photovoltaic panel, cell or string, said apparatus comprising:
a containing structure having an operating space defining an irradiation chamber equipped with an LED lighting unit;
a rest plane for said object, associated with said containing structure, said rest plane being able to be selectively positioned facing said lighting unit;
a first liquid cooling unit to thermally control said lighting unit, wherein said first liquid cooling unit is provided with both a heat extraction device associated with said lighting unit, and also with a connected cooling device outside said containing structure; and
a second air cooling unit dedicated to cooling said object and provided with a central collector equipped with diffuser elements, with a suction device associated at the lower part with said central collector, said central collector and suction device being disposed in a lower zone of said operating space, and also with an air feeding circuit connected to said central collector and to an air conditioning device outside said containing structure,
wherein said lighting unit is formed by a flat matrix of LED boards, and by corresponding control boards disposed aligned at a certain distance from the respective LED boards, said heat extraction device being interposed between said LED boards and said control boards, and
wherein said heat extraction device comprises a plurality of cooling plates provided with channels to convey a cooling fluid, each of said cooling plates being parallel and independent from the others and associated with a respective row of LED boards and control boards, forming a repetitive modular structure with them.

2. The solar simulator apparatus as in claim 1, wherein on each cooling plate there are created a first multilayer interface, to which said LED boards are attached, and an opposing second multilayer interface, to which the corresponding control boards are attached by means of the interposition of support elements.

3. The solar simulator apparatus as in claim 1, wherein said rest plane is disposed at a distance from said flat matrix of LED boards such as to optimize a distance between said rest plane and said object, said distance being comprised between 200 mm and 350 mm.

4. The solar simulator apparatus as in claim 1, wherein said containing structure is formed by a plurality of perimeter walls on the external and internal surfaces of which there is applied a layer of matte black paint.

5. The solar simulator apparatus as in claim 4, wherein said irradiation chamber is defined by a sub volume of said operating space comprised between said lateral perimeter walls, a lighting plane, formed by said flat matrix of LED boards, and said rest plane, wherein on the internal surfaces of said lateral perimeter walls there are installed mirrors facing said irradiation chamber.

6. A solar simulator apparatus, to perform a test on at least one object, such as a photovoltaic panel, cell or string, said apparatus comprising:
a containing structure having an operating space defining an irradiation chamber equipped with an LED lighting unit;
a rest plane for said object, associated with said containing structure, said rest plane being able to be selectively positioned facing said lighting unit; and
a first liquid cooling unit to thermally control said lighting unit, wherein said first liquid cooling unit is provided with both a heat extraction device associated with said lighting unit, and also with a connected cooling device outside said containing structure,
wherein said lighting unit is formed by a flat matrix of LED boards, and by corresponding control boards disposed aligned at a certain distance from the respective LED boards, said heat extraction device being interposed between said LED boards and said control boards,
wherein said heat extraction device comprises a plurality of cooling plates provided with channels to convey a cooling fluid, each of said cooling plates being parallel and independent from the others and associated with a respective row of LED boards and control boards, forming a repetitive modular structure with them, and
wherein said rest plane is formed by a frame having a plurality of sustaining bars on each of which there are mounted, able to be selectively positioned along a length of said sustaining bars, one or more support elements.

7. The solar simulator apparatus as in claim 6, wherein said support elements are provided with a conical end configured to define a rest for said object.

8. A solar simulator apparatus, to perform a test on at least one object, such as a photovoltaic panel, cell or string, said apparatus comprising:
a containing structure having an operating space defining an irradiation chamber equipped with an LED lighting unit;
a rest plane for said object, associated with said containing structure, said rest plane being able to be selectively positioned facing said lighting unit;
a first liquid cooling unit to thermally control said lighting unit, wherein said first liquid cooling unit is provided with both a heat extraction device associated with said lighting unit, and also with a connected cooling device outside said containing structure; and
a second air cooling unit dedicated to cooling said object and provided with a central collector equipped with diffuser elements, with a suction device associated at the lower part with said central collector, said central collector and suction device being disposed in a lower zone of said operating space, and also with an air feeding circuit connected to said central collector and to an air conditioning device outside said containing structure,
wherein said lighting unit is formed by a flat matrix of LED boards, and by corresponding control boards disposed aligned at a certain distance from the respective LED boards, said heat extraction device being interposed between said LED boards and said control boards,
wherein said heat extraction device comprises a plurality of cooling plates provided with channels to convey a cooling fluid, each of said cooling plates being parallel and independent from the others and associated with a respective row of LED boards and control boards, forming a repetitive modular structure with them, and
wherein said rest plane is formed by a frame having a plurality of sustaining bars on each of which there are mounted, able to be selectively positioned along a length of said sustaining bars, one or more support elements.

* * * * *